United States Patent Office.

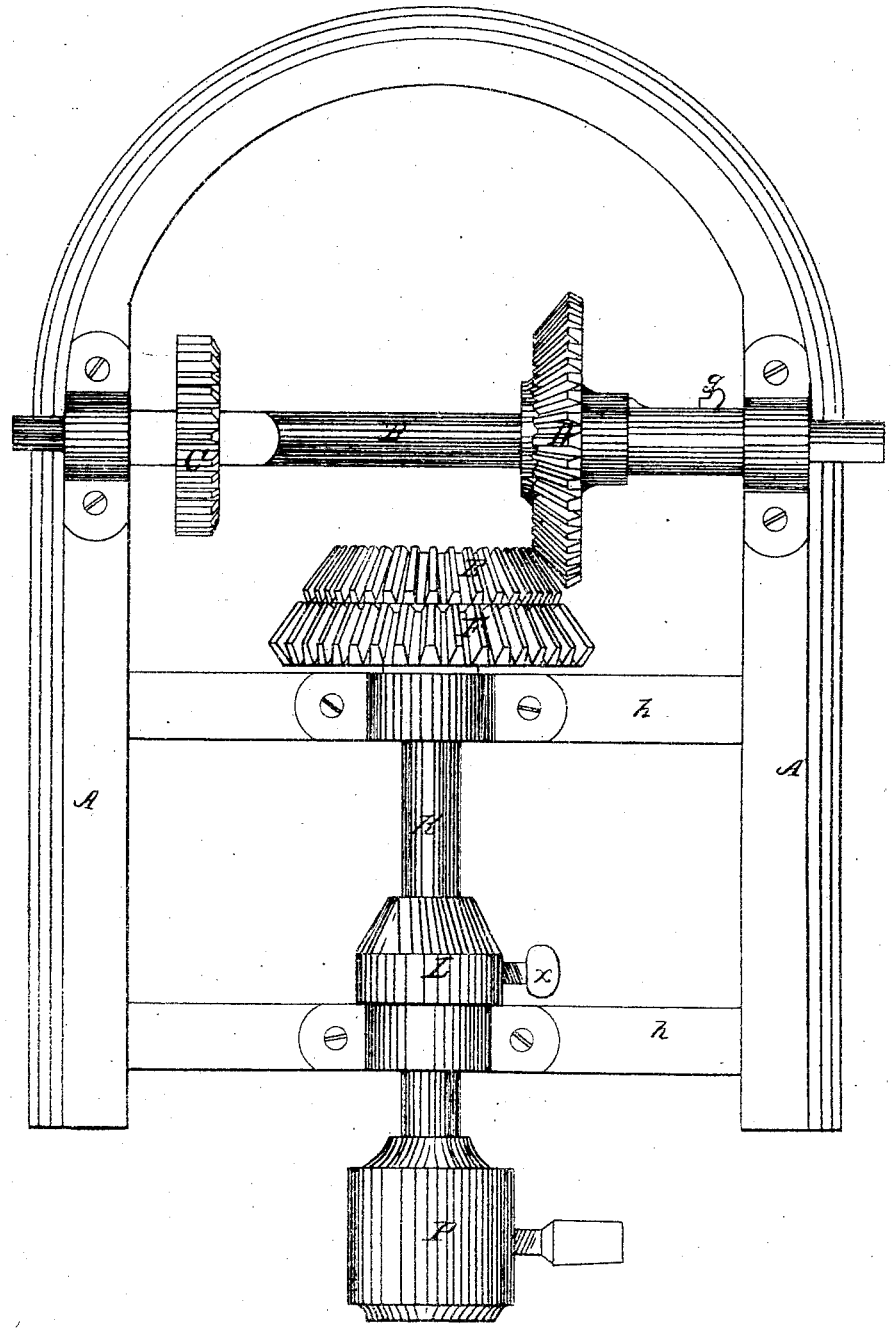

HUGH DOOL AND PHILO B. WHITE, OF DOWAGIAC, MICHIGAN.

Letters Patent No. 76,171, dated March 31, 1868.

IMPROVEMENT IN BORING-MACHINES.

*The Schedule referred to in these Letters Patent and making part of the same.*

TO ALL WHOM IT MAY CONCERN:

Be it known that we, HUGH DOOL and PHILO B. WHITE, of Dowagiac, in the county of Cass, and in the State of Michigan, have invented certain new and useful Improvements in Boring-Machines; and do hereby declare that the following is a full, clear, and exact description thereof, reference being had to the accompanying drawings, and the letters of reference marked thereon.

In the annexed drawings, making a part of this specification, A represents a frame of suitable size and strength, and is provided with cross-beams $h$ $h$, as shown in the drawings. A horizontal shaft, B, is adjusted in any suitable or convenient manner across and to the frame A near its top. Upon this shaft is rigidly secured the pinion C near one of its ends, and, loosely adjusted, the movable cog-wheel D near the other end of said shaft. The shaft B is provided with a suitable groove, in which fits and is secured a double catch-spring, $g$, which is provided with two shoulders. The spring $g$ fits in a groove in the hole of the wheel D, and holds it from turning on its shaft, and the shoulders thereof, hold said wheel in the required position, so it will mesh with either one or the other of the cog-wheels E or F, as may be desired. A shaft, K, is adjusted vertically in the middle of the frame, upon or by means of the cross-beams $h$ $h$, upon which are rigidly secured, at its upper end, the bevelled cog-wheels E and F, and to its lower end a suitable socket or device, P, for holding an auger, bit, or borer which may be adjusted therein. The shaft K is movable vertically, and is adjusted or held at any place desired by means of a collar, L, which fits loosely around it, but which is made stationary by means of the set-screw $x$ whenever the same may be required.

It is often desirable to change the speed of the borer to suit the difference in the hardness or solidity of the wood or material to be bored. This object is very conveniently attained by the above-described device, by adjusting the collar L on the shaft K, so as to let the same down to the required position, and then slipping the wheel D on the shaft B, so it will mesh with the wheel E and fasten said wheel D. By means of the shoulder on the spring $g$, a comparatively rapid motion or greater speed is given to the auger or borer in the socket P. To make the motion of the borer slower, or to give the same less speed by the same power, applied as above, press the spring $g$ down, and then slip the wheel D out against the shoulder of said spring, and then loose the set-screw $x$ and slip the shaft K up through the collar L, so that the wheel F will mesh with the movable wheel D. The difference in the speed of the borer will of course depend upon the difference in the diameter of the wheels E and F, which difference may be as great as, in practice, is found most desirable. It will be seen, however, that the bottom or lower wheel, F, must always be the larger of the two.

Having thus fully described our invention, what we claim as new, and desire to secure by Letters Patent, is—

The adjustable shaft K, provided with wheels E and F, of different diameters, in combination with the horizontal shaft B, provided with an adjustable wheel, D, when constructed and used substantially as and for the purpose specified.

In testimony that we claim the foregoing, we have hereunto set our hands, this 13th day of January, 1868.

HUGH DOOL,
                   PHILO B. WHITE.

Witnesses:
 EALHEN. A. HUFF,
 PRUS. H. WHITE.